(12) United States Patent
Lu

(10) Patent No.: US 8,179,003 B2
(45) Date of Patent: May 15, 2012

(54) MOTOR WITH WIRE FIXING PLATE

(75) Inventor: Chuping Lu, Zhongshan (CN)

(73) Assignee: Zhongshan Broad-Ocean Motor Co., Ltd., Zhongshan (CN)

(*) Notice: Subject to any disclaimer, the term of this patent is extended or adjusted under 35 U.S.C. 154(b) by 301 days.

(21) Appl. No.: 12/573,163

(22) Filed: Oct. 5, 2009

(65) Prior Publication Data

US 2010/0084931 A1 Apr. 8, 2010

(30) Foreign Application Priority Data

Oct. 6, 2008 (CN) .................. 2008 2 0201721 U

(51) Int. Cl.
*H02K 3/52* (2006.01)
(52) U.S. Cl. .......................................... 310/71
(58) Field of Classification Search ............ 310/71
See application file for complete search history.

(56) References Cited

U.S. PATENT DOCUMENTS

| | | | | |
|---|---|---|---|---|
| 2,872,599 | A * | 2/1959 | De Young | 310/71 |
| 3,984,714 | A * | 10/1976 | Grozinger et al. | 310/194 |
| 4,481,435 | A * | 11/1984 | Loforese | 310/71 |
| 5,214,331 | A * | 5/1993 | Nishimura et al. | 310/71 |
| 5,717,273 | A * | 2/1998 | Gulbrandson et al. | 310/260 |
| 7,342,334 | B2 * | 3/2008 | Hilton et al. | 310/71 |
| 7,414,347 | B2 * | 8/2008 | Wang et al. | 310/260 |

FOREIGN PATENT DOCUMENTS

JP 6-225491 * 8/1994

OTHER PUBLICATIONS

JPO IPDL Database Machine Translation of JP 6-225491 to Hattori et al., Aug. 1994.*

* cited by examiner

*Primary Examiner* — Burton Mullins
(74) *Attorney, Agent, or Firm* — Matthias Scholl P.C.; Matthias Scholl

(57) ABSTRACT

A motor with a wire fixing plate, has a stator core, a stator winding, a lead wire, and a wire fixing plate including multiple fixed portions. The wire fixing plate is made of insulating plastics, and the lead wire is fixed on the wire fixing plate via the fixed portions. The motor features firm fixation and good insulating property of a lead wire and a simple production process.

12 Claims, 4 Drawing Sheets

MOTOR WITH WIRE FIXING PLATE

CROSS-REFERENCE TO RELATED APPLICATIONS

Pursuant to 35 U.S.C. §119 and the Paris Convention Treaty, this application claims the benefit of Chinese Patent Application No. 200820201721.9 filed on Oct. 6, 2008, the contents of which are incorporated herein by reference.

BACKGROUND OF THE INVENTION

1. Field of the Invention

The invention relates to a motor, and more particularly to a motor with a wire fixing plate.

2. Description of the Related Art

A conventional motor includes a stator core, stator and a lead wire. However, there are several problems with the motor: insulating property of the lead wire is poor, the lead wire is difficult to be fixed, and a production process of the motor is complex.

SUMMARY OF THE INVENTION

In view of the above-described problem, it is one objective of the invention to provide a motor with a wire fixing plate that features firm fixation and good insulating property of a lead wire and a simple production process.

To achieve the above objectives, in accordance with one embodiment of the invention, provided is a motor with a wire fixing plate, comprising a stator core, a stator winding, a lead wire, and a wire fixing plate comprising multiple fixed portions. The wire fixing plate is made of insulating plastics, and the lead wire is fixed on the wire fixing plate via the fixed portions.

In a class of this embodiment, a groove is disposed in the fixed portion of the wire fixing plate.

In a class of this embodiment, a pressing buckle is disposed at the top of the groove.

In a class of this embodiment, the lead wire is fixed in the groove via the pressing buckle.

In a class of this embodiment, the fixed portion comprises a pair of protruding portions opposite to each other.

In a class of this embodiment, the groove is formed between the protruding portions.

In a class of this embodiment, the pressing buckle is disposed on the inner side at the top of one of the protruding portions, and a first flange is disposed on the inner side of the other protruding portion and staggered with the pressing buckle.

In a class of this embodiment, a wire inlet is disposed on the wire fixing plate.

In a class of this embodiment, multiple separating bars are extended from both sides of the wire inlet.

In a class of this embodiment, a channel is formed between adjacent separating bars whereby allowing the lead wire to pass.

In a class of this embodiment, multiple wire outlets are circumferentially disposed on the wire fixing plate, and there is a gap between adjacent wire outlets.

In a class of this embodiment, multiple stop plates are disposed on the wire fixing plate.

In a class of this embodiment, a through hole is disposed at the center of the wire fixing plate.

In a class of this embodiment, a second flange is disposed in the vicinity of the through hole.

In a class of this embodiment, multiple hooks are disposed at the top of the second flange.

In a class of this embodiment, multiple slots are disposed on the second flange.

Advantages of the invention comprise: 1) the wire fixing plate is made of insulating plastics with good insulating property and capable of separating the lead wire from the stator winding, and features simple structure and good heat insulation effect; 2) the lead wire is fixed on the wire fixing plate and operations such as insulating, binding wires and so on are not required, which improves fixation effect, processing property and production efficiency; 3) the pressing buckle makes it easy and convenient to fix the lead wire on the wire fixing plate, and the fixation effect is good; 4) the protruding portions are capable of protecting the lead wire, and the pressing buckle and the first flange staggered from each other tightly clamp the lead wire and further improve fixation effect; 5) the separating bars, the stop plate and the wire outlet limit positions of lead wires and separate lead wires from each other, which ensures insulation between lead wires and makes wiring more reasonable; 6) the through hole, the hook and the slot make it easy and convenient to tightly fix the wire fixing plate on the stator core.

BRIEF DESCRIPTION OF THE DRAWINGS

The invention is described hereinafter with reference to accompanying drawings, in which.

DETAILED DESCRIPTION OF THE EMBODIMENTS

Figure 1:
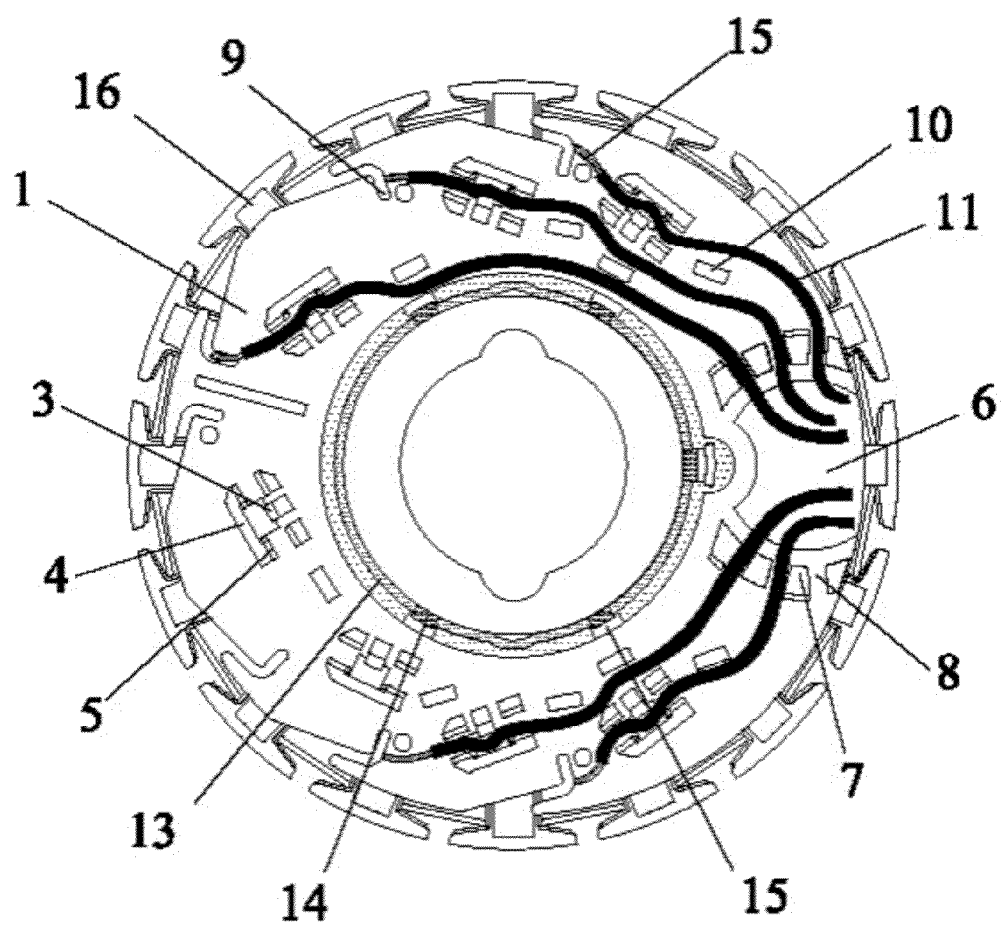
FIG. 1 is a schematic view of a motor with a wire fixing plate of an exemplary embodiment of the invention.
Figure 2:
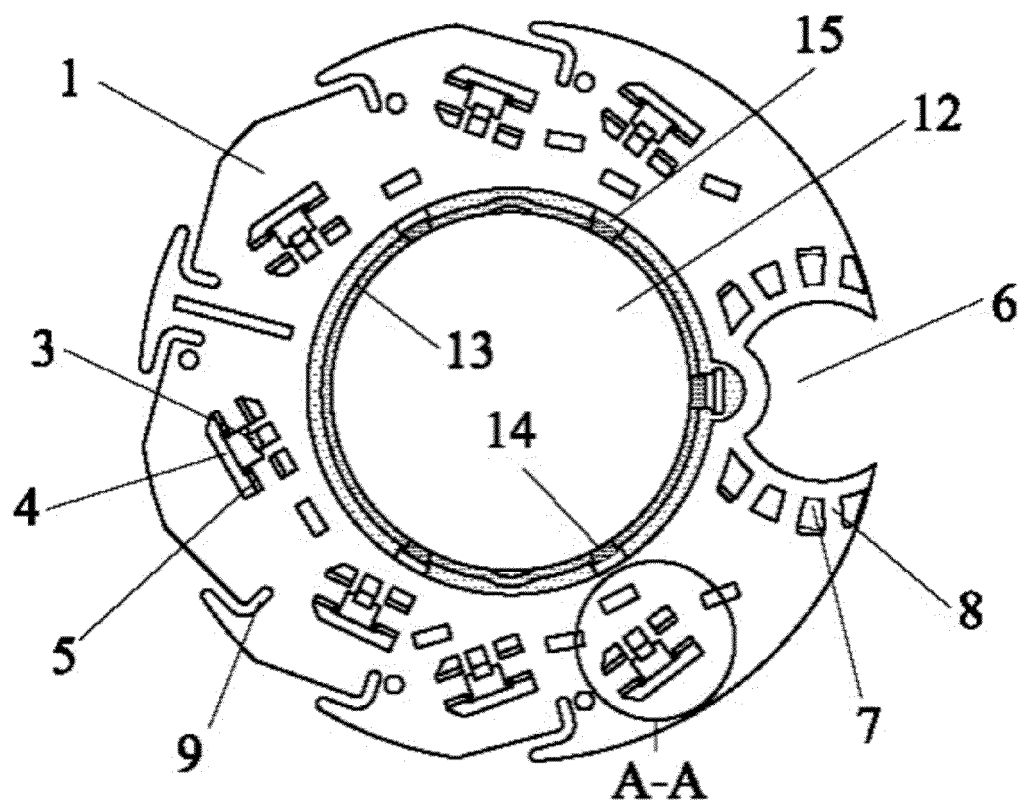
FIG. 2 is a schematic view of a wire fixing plate of an exemplary embodiment of the invention.
Figure 3:
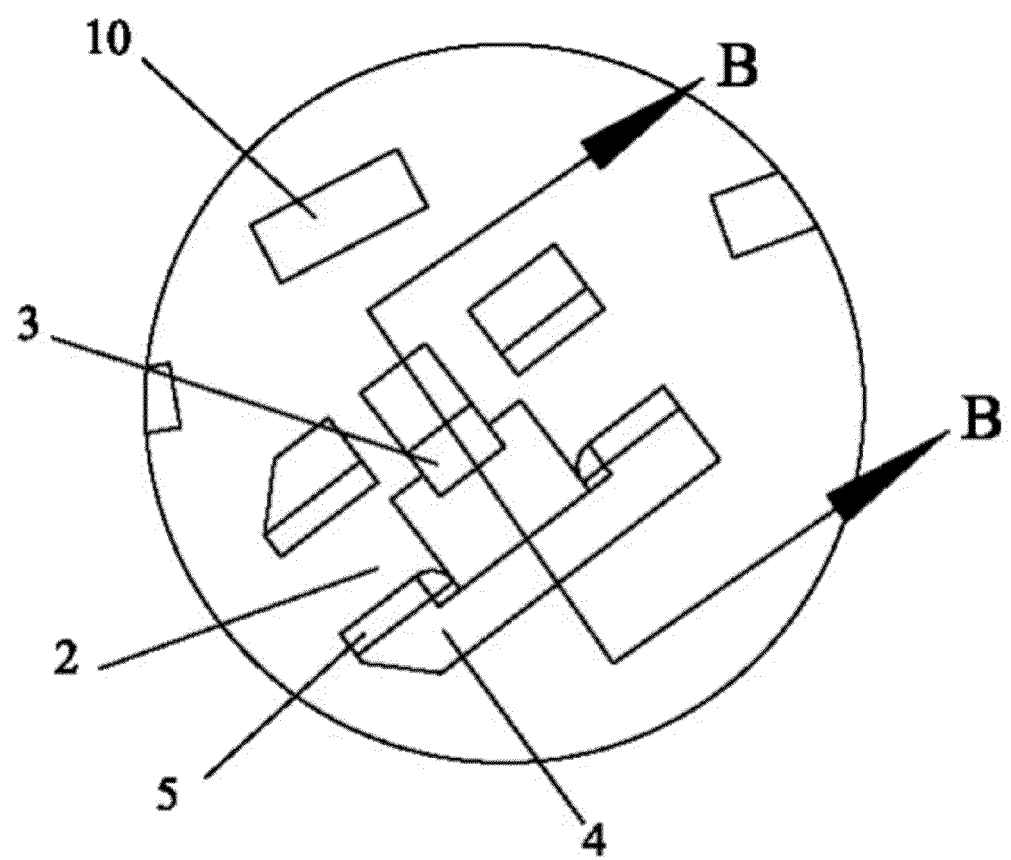
FIG. 3 is an enlarged view taken along the line A-A of FIG. 2.
Figure 4:
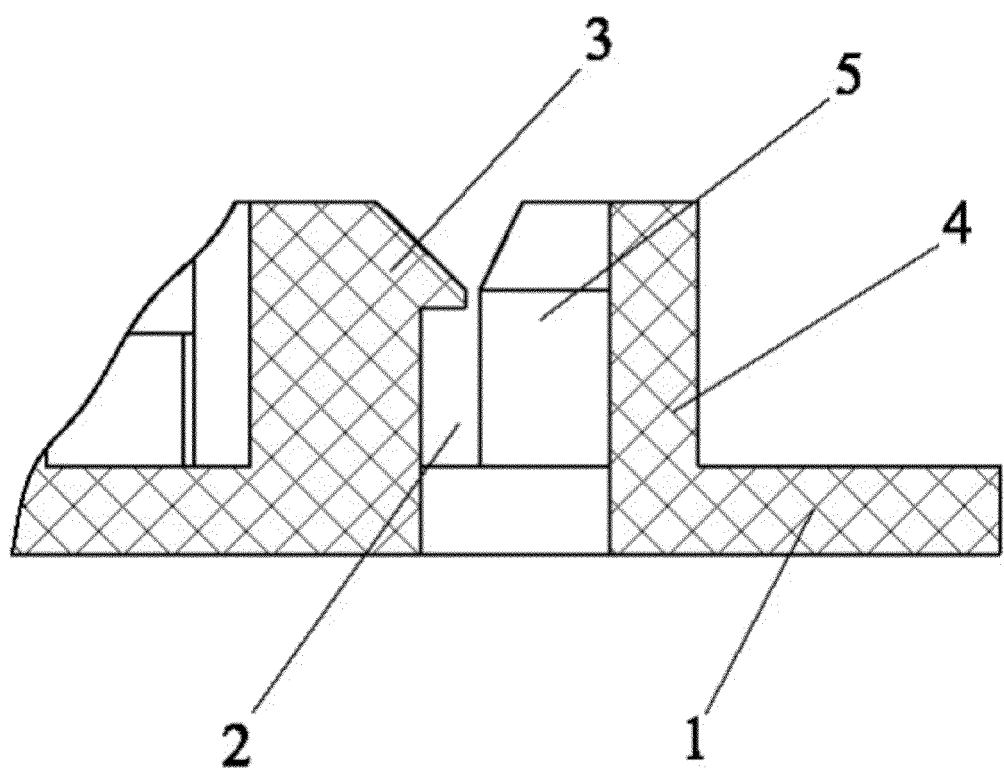
FIG. 4 is a cross-sectional view taken along the line B-B of FIG. 3.

As shown in FIGS. 1-4, a motor with a wire fixing plate of the invention comprises a stator core, a stator winding 16, a lead wire 11, and a wire fixing plate 1. The wire fixing plate 1 comprises multiple fixed portions, and the lead wire 11 is fixed on the wire fixing plate 1 via the fixed portions. In this embodiment, the wire fixing plate 1 is made of insulating plastics.

A groove 2 is disposed in the fixed portion of the wire fixing plate 1, a pressing buckle 3 is disposed at the top of the groove 2, and the lead wire 11 is fixed in the groove 2 via the pressing buckle 3.

The wire fixing plate 1 is capable of separating the lead wire 11 from the stator winding 16, and features simple structure and good heat insulation effect.

The lead wire 11 is fixed on the wire fixing plate 1, and operations such as insulating, binding wires and so on are not required, which improves fixation effect, processing property and production efficiency.

The pressing buckle 3 makes it easy and convenient to fix the lead wire 11 on the wire fixing plate 1, and the fixation effect is good.

The fixed portion comprises a pair of protruding portions 4 opposite to each other, the groove 2 is formed between the protruding portions 4, the pressing buckle 3 is disposed on the inner side at the top of one of the protruding portions 4, and a first flange 5 is disposed on the inner side of the other protruding portion 4 and staggered from the pressing buckle 3.

The protruding portions 4 are capable of protecting the lead wire 11, and the pressing buckle 3 and the first flange 5 staggered from each other tightly clamp the lead wire 11 and further improve fixation effect.

A wire inlet 6 is disposed on the wire fixing plate 1, multiple separating bars 7 are extended from both sides of the wire inlet 6, and a channel 8 is formed between adjacent separating bars 7 whereby allowing the lead wire 11 to pass.

Multiple wire outlets 9 are circumferentially disposed on the wire fixing plate 1, and there is a gap between adjacent wire outlets 9.

Multiple stop plates 10 are disposed on the wire fixing plate 1.

The separating bars 7, the stop plate 10 and the wire outlet 9 limit positions of lead wires 11 and separate lead wires 11 from each other, which ensures insulation between lead wires 11 and makes wiring more reasonable.

A through hole 12 is disposed at the center of the wire fixing plate 1, a second flange 13 is disposed in the vicinity of the through hole 12, multiple hooks 14 are disposed at the top of the second flange 13, and multiple slots 15 are disposed on the second flange 13.

The through hole 12, the hook 14 and the slot 15 make it easy and convenient to tightly fix the wire fixing plate 1 on the stator core.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor with a wire fixing plate, comprising:
   a stator core;
   a stator winding;
   a lead wire; and
   a wire fixing plate comprising multiple fixed portions;
   wherein
   said wire fixing plate is made of insulating plastics;
   said lead wire is fixed on said wire fixing plate via said fixed portions;
   a wire inlet is disposed on said wire fixing plate; and
   multiple separating bars extend from both sides of said wire inlet.

2. The motor of claim 1, wherein a channel is formed between adjacent separating bars whereby allowing said lead wire to pass.

3. A motor with a wire fixing plate, comprising:
   a stator core;
   a stator winding;
   a lead wire; and
   a wire fixing plate comprising multiple fixed portions;
   wherein
   said wire fixing plate is made of insulating plastics;
   said lead wire is fixed on said wire fixing plate via said fixed portions;
   a groove is disposed in said fixed portion of said wire fixing plate;
   a pressing buckle is disposed at the top of said groove;
   said lead wire is fixed in said groove via said pressing buckle;
   said fixed portion comprises a pair of protruding portions opposite to each other;
   said groove is formed between said protruding portions;
   said pressing buckle is disposed on the inner side at the top of one of said protruding portions; and
   a first flange is disposed on the inner side of the other protruding portion and staggered with said pressing buckle.

4. The motor of claim 3, wherein a wire inlet is disposed on said wire fixing plate.

5. The motor of claim 4, wherein multiple separating bars extend from both sides of said wire inlet.

6. The motor of claim 5, wherein a channel is formed between adjacent separating bars, whereby allowing said lead wire to pass.

7. The motor of claim 3, wherein
   multiple wire outlets are circumferentially disposed on said wire fixing plate; and
   there is a gap between adjacent wire outlets.

8. The motor of claim 3, wherein multiple stop plates are disposed on said wire fixing plate.

9. The motor of claim 3, wherein a through hole is disposed at the center of said wire fixing plate.

10. The motor of claim 9, wherein a second flange is disposed in the vicinity of said through hole.

11. The motor of claim 10, wherein multiple hooks are disposed at the top of said second flange.

12. The motor of claim 10, wherein multiple slots are disposed on said second flange.

* * * * *